United States Patent
Kita et al.

(10) Patent No.: US 7,638,571 B2
(45) Date of Patent: Dec. 29, 2009

(54) PARTICULATE CHROMATIC RESIN COMPOSITION

(75) Inventors: Yasuo Kita, Osaka (JP); Tomohiko Akagawa, Osaka (JP); Tatsushi Ako, Osaka (JP); Kenji Nozaki, Osaka (JP); Satoru Yasui, Osaka (JP)

(73) Assignee: Ube Industries, Ltd., Ube-shi, Yamaguchi (JP)

( * ) Notice: Subject to any disclaimer, the term of this patent is extended or adjusted under 35 U.S.C. 154(b) by 0 days.

(21) Appl. No.: 11/911,463

(22) PCT Filed: Apr. 17, 2006

(86) PCT No.: PCT/JP2006/308074

§ 371 (c)(1),
(2), (4) Date: Oct. 12, 2007

(87) PCT Pub. No.: WO2006/112444

PCT Pub. Date: Oct. 26, 2006

(65) Prior Publication Data

US 2009/0062447 A1    Mar. 5, 2009

(30) Foreign Application Priority Data

Apr. 15, 2005 (JP) .............................. 2005-119016
Apr. 15, 2005 (JP) .............................. 2005-119017
Apr. 15, 2005 (JP) .............................. 2005-119018

(51) Int. Cl.
*B01F 17/00* (2006.01)
*C08G 73/00* (2006.01)
*B60C 1/00* (2006.01)

(52) U.S. Cl. ........................ 524/431; 524/409; 524/570

(58) Field of Classification Search .................. 524/431
See application file for complete search history.

(56) References Cited

U.S. PATENT DOCUMENTS 3,907,581 A    9/1975    Willcox
6,448,312 B1   9/2002    Oshima et al.

FOREIGN PATENT DOCUMENTS

JP    09-194631    7/1997
JP    2000-169664  6/2000
JP    2004-277516  10/2004

OTHER PUBLICATIONS

Translation of JP 2004277516, Oct. 2004.*
International Search Report mailed May 16, 2006 for International Application No. PCT/JP2006/308074 filed Apr. 17, 2006.
English translation of International Preliminary Report on Patentability and Written Opinion of the International Searching Authority mailed Oct. 25, 2007 for International Application No. PCT/JP2006/308074 filed Apr. 17, 2006.

* cited by examiner

*Primary Examiner*—Ling-Siu Choi
*Assistant Examiner*—Hui Chin
(74) *Attorney, Agent, or Firm*—Nixon Peabody LLP; Jeffrey L. Costellia

(57) ABSTRACT

A particulate chromatic resin composition comprises an unused thermoplastic resin component, a chromatic pigment and a white pigment, or a particulate white resin composition comprises an unused thermoplastic resin component, a white pigment and a black pigment, in which a sheet made from resin composition shows a relationship between a lightness and a light transmittance satisfying the following condition:

$$1300 \leq (L^* \times B) \leq 4000$$

wherein $L^*$ means a lightness of a sheet of 3 mm thick having been made of the resin composition, and B means a total light transmittance in terms of % of a sheet of 50 μm thick having been made of the resin composition.

15 Claims, No Drawings

PARTICULATE CHROMATIC RESIN COMPOSITION

FIELD OF INVENTION

The present invention relates to a particulate chromatic or white resin composition which is advantageously used for producing various chromatic or white resin-molded articles such as plastic parts of household electric appliances, plastic cases, plastic elements of office apparatuses, and automobile plastic parts (e.g., bumper, interior and exterior members).

PRIOR ART

Chromatic resin-molded articles are used for various plastic parts of industrial products, such as parts of air conditioner (e.g., housing, fin), parts of washing machine (e.g., pedestal, washing tank, balancer, exterior panel), parts of refrigerator (e.g., grill, carrying handle, evaporation tray, food case, upper table), parts of copying machine (e.g., panel, housing, paper-feeding tray), and automobile parts (e.g., bumper, interior and exterior members). The chromatic resin-molded articles are usually produced by the steps of: mixing chromatic pigments and, if needed, additives such as a filler and an elastomer resin, into an unused thermoplastic such as a polyolefin or ABS resin to prepare a thermoplastic resin composition (such starting composition consisting of unused materials is generally referred to as "virgin material") in the form of particulates (e.g., powder, pellets, flakes, particles, pulverized fine pieces); heating to melt the composition; introducing the melt into a molding die; and cooling the molded composition.

In the same manner, white resin-molded articles used for various plastic parts of industrial products are also produced from a particulate white thermoplastic resin composition, which is prepared by mixing an unused thermoplastic resin such as a polyolefin or ABS resin and optional additives such as a filler, an elastomer resin and a white pigment.

In the process of preparing the particulate composition or of molding the composition, the melted resin is sometimes locally overheated to produce colored denatured substances, which are left in the resulting article. Further, fine solid foreign materials floating in the air or attaching to the molding die are often caught and involved in the particulate or melted composition and, as a result, to remain in the resulting article. If the molded article is contaminated with a specific amount or more of the denatured substances or the foreign materials, they appear on a surface of the article. Since the denatured substances and the foreign materials are generally colored dark, they appear in the white or pale-colored resin-molded article.

Due to inferior appearance, the molded article having a surface showing the denatured substances or foreign materials is unfavorably used for household electric appliances, cases, office apparatuses, and automobile parts. Therefore, the article in which the denatured substances or foreign materials are observed may be discarded as a defective product. Otherwise, in order to utilize that molded article, the surface showing the denatured substances or foreign materials may be coated to keep them out of sight. Further, it is studied to reuse that article as a starting material for resin products of which appearance is scarcely observed.

Meanwhile, it has been recently desired to recycle various materials, and hence resin-molded articles used in electric appliances, office apparatuses and automobile parts are also wanted to be highly recycled. Accordingly, recycling of various resin materials has been studied by many corporations, such as manufacturers of electric appliances, office apparatuses and automobile parts, as well as, of resin-molded articles installed therein; material suppliers for the resin-molded articles; and waste-management companies treating the above-mentioned products having been used and discarded. Objects to be recycled are roughly categorized into two types; one is the aforementioned defective product (normally, referred to as "process-defective product") obtained in the production process of resin-molded article, and the other is a recovered resin material separated from waste products (such as waste electric appliances, discarded office apparatuses and scrapped automobiles) having been practically used and then abandoned.

WO 03/095531 A1 discloses a process for producing a particulate composition of chromatic reclaimed resin. The process comprises the steps of: mixing white and covered from waste products made of a thermoplastic resin containing a black pigment or into a mixture of pulverized materials recovered from waste products made of thermoplastic resins containing black and chromatic pigments or containing two or more different chromatic pigments; heating to melt the obtained mixture; and converting the melt into a particulate solid composition.

WO 03/089500 A1 also discloses a process for recycling a pulverized waste thermoplastic resin material containing a black or chromatic pigment and a small amount of cured resins. The process comprises the steps of: mixing one or more light-shielding pigments such as white, black and chromatic pigments into the pulverized waste resin material; heating to melt the resulting mixture; and converting the melt into a particulate solid composition. According to the process, a waste thermoplastic resin product coated with a cover film (e.g., bumper of scrapped automobile) can be converted without removing the cover film into a particulate reclaimed resin composition reusable for various purposes.

DISCLOSURE OF INVENTION

Problems to be Solved

With respect to the pulverized resin material recovered from waste products made of thermoplastic resins containing black or chromatic pigments, it is revealed that the waste resin can be reclaimed according to the process in which light-shielding pigments are supplementally incorporated in the manner disclosed in the above-mentioned WO publications.

However, in the above-mentioned processes, it is necessary frequently to monitor the contamination with the solid foreign materials and thereby to determine the amount and kinds of the light-shielding pigments. The known processes, therefore, need a lot of care and attention.

Accordingly, it is a principal object of the invention to provide a technology for reducing molded articles having inferior appearance, which have been conventionally discarded as process-defective products. The appearance of those molded articles is impaired by foreign materials caught therein and/or denatured substances produced accidentally in the process of molding a white or chromatic thermoplastic resin composition (virgin material) to prepare the white or chromatic molded articles used for parts of household electric appliances, office apparatuses and automobiles.

Further, it is another object of the invention to provide a technology for making it unnecessary to incorporate light-shielding pigments or to control delicately how much the light-shielding pigments are added in the process of reclaiming pulverized resin material recovered from waste white or chromatic thermoplastic resin products.

DESCRIPTION OF THE INVENTION

The present inventors have discovered that, if a white pigment (preferably, in combination with a small amount of a black pigment) is present under a specific condition in the process where chromatic pigments and a filler are mixed into an unused thermoplastic resin such as a polyolefin or ABS resin to prepare a particulate resin composition, a molded article produced by heating and melting the composition has a surface of good appearance even if a small amount of solid foreign materials and chromatic denatured substances are contained therein. In other words, it is possible to prevent the foreign materials and denatured substances from appearing on a surface of the molded article (namely, the foreign materials and denatured substances can be made invisible).

The inventors have also discovered that, if a small amount of a black pigment is present under a specific condition in the process where a white pigment and a filler are mixed into an unused thermoplastic resin such as a polyolefin or ABS resin to prepare a particulate white resin composition, a molded article produced by heating and melting the composition has a surface of good appearance even if a small amount of solid foreign materials and chromatic denatured substances are contained therein. In other words, it is possible to prevent the foreign materials and denatured substances from appearing on a surface of the molded article (namely, the foreign materials and denatured substances can be made invisible).

The present invention resides in a particulate chromatic resin composition comprising an unused thermoplastic resin component, a chromatic pigment and a white pigment, a sheet made from which shows a relationship between a lightness and a light transmittance satisfying the following condition:

$$1300 \leq (L^* \times B) \leq 4000$$

wherein $L^*$ means a lightness of a sheet of 3 mm thick having been made of the resin composition, and B means a total light transmittance in terms of % of a sheet of 50 μm thick having been made of the resin composition.

The term "chromatic resin composition" in the invention means a resin composition showing a whiteness of less than 55.

The invention also resides in a resin-molded article produced by heating to melt the above-mentioned specific particulate chromatic resin composition and then molding the melt.

The invention further resides in a particulate white resin composition comprising an unused thermoplastic resin component, a white pigment and a black pigment, a sheet made from which shows a relationship between a lightness and a light transmittance satisfying the following condition:

$$1300 \leq (L^* \times B) \leq 4000$$

wherein $L^*$ means a lightness of a sheet of 3 mm thick having been made of the resin composition, and B means a total light transmittance in terms of % of a sheet of 50 μm thick having been made of the resin composition. The lightness $L^*$ is preferably in the range of 55 to 90, more preferably in the range of 60 to 90, further preferably in the range of 70 to 90, most preferably in the range of 80 to 90.

The term "white resin composition" in the invention typically means a resin composition showing a whiteness of 55 or more. For preparing a composition showing a whiteness of 50 to 60, either a set of chromatic and white pigments or a set of white and black pigments can be used.

The invention furthermore resides in a resin-molded article produced by heating to melt the above-mentioned particulate white resin composition and then molding the melt.

The preferred embodiments of the particulate chromatic resin composition according to the invention are described below.

(1) The particulate chromatic resin composition further comprises a black pigment.

(2) The particulate chromatic resin composition comprises a filler.

(3) The thermoplastic resin component is mainly composed of polyolefin (in an amount of 50 wt. % or more).

(4) The total light transmittance B of the sheet made from the particulate chromatic resin composition is in the range of 15 to 60% (preferably in the range of 18 to 55%, more preferably in the range of 20 to 50%, further preferably in the range of 25 to 48%).

(5) The particulate chromatic resin composition comprises the white pigment in an amount of 1 to 20 wt. % (preferably in the range of 1 to 20 wt. %, more preferably in the range of 1.5 to 18 wt. %, further preferably in the range of 2 to 15 wt. %, most preferably in the range of 3 to 12 wt. %).

(6) The white pigment contained in the particulate chromatic resin composition is titanium dioxide.

(7) The particulate chromatic resin composition comprises the black pigment in an amount of 0.01 to 1.0 wt. % (preferably in the range of 0.05 to 0.8 wt. %, more preferably in the range of 0.01 to 0.5 wt. %, further preferably in the range of 0.012 to 0.3 wt. %), and the black pigment is less contained than the white pigment.

(8) The black pigment contained in the particulate chromatic resin composition is iron black.

(9) The sheet of 3 mm thick having been made of the particulate chromatic resin composition shows a whiteness of less than 55.

(10) The value of "$L^* \times B$" is in the range of 1300 to 4000 (preferably in the range of 1500 to 4000, more preferably in the range of 1800 to 4000, further preferably in the range of 2000 to 3800).

The preferred embodiments of the particulate white resin composition according to the invention are described below.

(1) The particulate white resin composition comprises a filler.

(2) The thermoplastic resin component is mainly composed of polyolefin (in an amount of 50 wt. % or more).

(3) The lightness $L^*$ of the sheet made from the particulate white resin composition is in the range of 55 to 90 (preferably in the range of 60 to 90, more preferably in the range of 70 to 90, further preferably in the range of 80 to 90).

(4) The total light transmittance B of the sheet made from the particulate white resin composition is in the range of 15 to 60% (preferably in the range of 18 to 55%, more preferably in the range of 20 to 50%, further preferably in the range of 25 to 48%).

(5) The particulate white resin composition comprises the white pigment in an amount of 1 to 20 wt. % (preferably in the range of 1 to 20 wt. %, more preferably in the range of 1.5 to 18 wt. %, further preferably in the range of 2 to 15 wt. %, most preferably in the range of 3 to 12 wt. %).

(6) The white pigment contained in the particulate white resin composition is titanium dioxide.

(7) The particulate white resin composition comprises the black pigment in an amount of 0.01 to 1.0 wt. % (preferably in the range of 0.05 to 0.8 wt. %, more preferably in the range of 0.01 to 0.5 wt. %, further preferably in the range of 0.012 to 0.3 wt. %), and the black pigment is less contained than the white pigment.

(8) The black pigment contained in the particulate white resin composition is iron black.

(9) The sheet of 3 mm thick having been made of the particulate white resin composition shows a whiteness of 55 or more (preferably 65 or more, more preferably 75 or more, further preferably 80 or more).

(10) The value of "L*×B" is in the range of 1300 to 4000 (preferably in the range of 1500 to 4000, more preferably in the range of 1800 to 4000, further preferably in the range of 2000 to 3800).

EFFECT OF THE INVENTION

The particulate chromatic or white resin composition of the invention makes it possible to reduce molded articles having inferior appearance, which have been heretofore discarded as process-defective products. The appearance of those molded articles has been impaired by foreign materials caught therein and/or denatured sub-stances produced accidentally in the process of heating and molding a known specific chromatic resin composition (virgin material) to prepare the molded articles.

Further, in recycling a waste white-resin molded article having been produced from the particulate chromatic or white resin composition of the invention, it is unnecessary to incorporate light-shielding pigments or to control delicately how much the light-shielding pigments are added in the process of reclaiming pulverized resin material recovered from the waste article.

PREFERRED EMBODIMENTS OF THE INVENTION

The particulate chromatic resin composition of the invention is described below in detail.

The chromatic resin composition of the invention comprises an unused thermoplastic resin component such as an unused polyolefin or ABS resin, a chromatic pigment, a white pigment and, preferably, a black pigment. Further, the composition can also comprise a filler. The thermoplastic resin component can contain an elastomer resin.

In the case that the polyolefin resin and the elastomer resin are used in combination, the weight ratio between polyolefin and elastomer in the thermoplastic resin component is normally in the range of 100:1 to 100:80 (preferably in the range of 100:1 to 100:50, more preferably in the range of 100:5 to 100:40).

Examples of the thermoplastic resins include polyolefin resins, polycarbonate resins, polyurethane resins, styrene resins, ABS resins (acrylonitrile-butadiene-styrene resin), polyester resins (such as polybutylene terephthalate and polyethylene terephthalate), polyphenyl ether resins (such as modified polyphenylene ether and polyphenylene sulfide), polyacryl resins (such as poly(methyl methacrylate)), polyamide resins (such as 6-nylon, 66-nylon, 12-nylon, and 6,12-nylon), and polysulfones.

Examples of the polyolefin resins include polypropylene resins (such as crystalline polypropylene), polyethylene resins (such as high density polyethylene and low density polyethylene), and mixtures thereof.

The elastomer resin can be a thermoplastic low-crystalline elastomer showing no clear yield point or a thermoplastic amorphous elastomer or rubber that shows neither clear melting point nor clear yield point and has rubber-like elasticity at room temperature. Examples of the elastomer resins include thermoplastic elastomers such as styrenic elastomer, olefinic elastomer, polyester elastomer, polyamide elastomer, and polyurethane elastomer. The elastomer resins can be used singly or in combination.

In preparing the particulate chromatic resin composition of the invention, a relatively small amount of reclaimed can be mixed into the unused thermoplastic resin component (virgin material), if desired.

Where the particulate chromatic resin composition contains a filler, the filler may be an organic or inorganic one other than the pigments. As the filler, an inorganic filler is preferred and a light-shielding filler is also preferred. The amount of the filler is preferably 40 weight parts or less based on 100 weight parts of the thermoplastic resin component.

Examples of the inorganic fillers include talc, clay, mica, silica, diatomaceous earth, MOS-HIGE (fibrous basic magnesium sulfate), TISMO (fibrous potassium titanate), wollastonite, montmorillonite, bentonite, dolomite, dosonite, silicates, carbon fibers, glass fibers, barium ferrite, beryllium oxide, aluminum hydroxide, magnesium hydroxide, basic magnesium carbonate, calcium carbonate, magnesium carbonate, magnesium sulfate, calcium sulfate, barium sulfate, ammonium sulfate, calcium sulfite, calcium silicate, molybdenum sulfide, zinc borate, barium methaborate, calcium borate, sodium borate, metals (such as zinc, copper, iron, lead, aluminum, nickel, chromium, titanium, manganese, tin, platinum, tungsten, gold, magnesium, cobalt and strontium), oxides of these metals, metal alloys (such as stainless (such as silicon carbide, silicon nitride, zirconia, aluminum nitride and titanium carbide) in the form of powders, whiskers and fibers. Talc and mica are particularly preferred.

As the chromatic pigments, known pigments can be used without any limitations. Examples of the chromatic pigments include inorganic pigments such as oxides, hydroxides, sulfides, chromates, carbonates, sulfates and silicates of metals; and organic pigments such as azo compounds, diphentylmethane compounds, triphenylmethane compounds, phthalocyanine compounds, nitro compounds, nitroso compounds, anthraquinone compounds, quinacridone red compounds, benzidine compounds, and fused polycyclic compounds. Also employable are chromatic fibers and glossy metal particles. There are no specific limitations with respect to hue of the chromatic pigment. Any of yellow pigments, blue pigments, red pigments, and green pigments can be employed. The pigments can be employed in combination of two or more.

Concrete examples of the chromatic pigments employable in the invention include inorganic pigments such as iron oxide red, ultramarine blue, cobalt blue, titanium yellow, prussian blue, zinc sulfide, barium yellow, cobalt blue, and cobalt green; organic pigments such as quinacridone red, polyazo yellow, anthraquinone red, anthraquinone yellow, polyazo red, azo lake yellow, perylene, phthalocyanine blue, phthalocyanine green, isoindolinone yellow, watchung red, permanent red, para red, toluidine maroon, benzidine yellow, fast sky blue, and brilliant carmine 6B; chromatic fibers, and glossy metal particles. These pigments can be employed in combination of two or more.

There are no specific limitations with respect to mean size of the titanium yellow. It is preferred that the mean size is within 0.1 to 1.5 μm, more preferably 0.5 to 1.3 μm, more preferably 0.7 to 1.1 μm, and most preferably 0.8 to 1 μm, because they are satisfactory in dispersability and handling. There are no specific limitations with respect to DOP absorption of the titanium yellow, it is preferred that the DOP absorption is within 15 to 40 cc/100 g, more preferably 20 to 35 cc/100 g, and most preferably 20 to 30 cc/100 g. There are no specific limitations with respect to pH of the titanium yellow. Preferred is pH 6 to 10, and pH 7 to 9 is most preferred.

As for the ultramarine blue, any of known ultramarine blue pigments can be employed without any limitations. There are no specific limitations with respect to mean size of the ultramarine blue. It is preferred that the mean size is within 0.1 to 5 µm, more preferably 0.5 to 4 µm, more preferably 0.8 to 3.5 µm, and most preferably 1 to 3 µm, because they are satisfactory in dispersability and handling. There are no specific limitations with respect to DOP absorption of the ultramarine blue. It is preferred that the DOP absorption is within 20 to 50 cc/100 g, more preferably 25 to 40 cc/100 g, and most preferably 30 to 35 cc/100 g. There are no specific limitations with respect to pH of the ultramarine blue. Preferred is pH 5 to 11, more preferred is pH 5.5 to 11, and most preferred is pH 7 to 11.

As for the phthalocyanine blue, any of known phthalocyanine blue pigments can be employed without any limitations. For instance, those produced by the Waller process or the phthalonitrile process can be employed. There are no specific limitations with respect to form of the phthalocyanine blue. Phthalocyanine blue pigments of α-type and β-type can be employed. There are no specific limitations with respect to mean size of the phthalocyanine blue. It is preferred that the mean size is within 0.01 to 2 µm, more preferably 0.05 to 1.5 µm, more preferably 0.1 to 0.4 µm, and most preferably 0.1 to 1 µm.

As for the phthalocyanine green, any of known phthalocyanine green pigments can be employed without any limitations. For instance, those produced by the Waller process or the phthalonitrile process can be employed. There are no specific limitations with respect to form of the phthalocyanine green. Phthalocyanine green pigments of α-type and β-type can be employed. There are no specific limitations with respect to mean size of the phthalocyanine green. It is preferred that the mean size is within 0.01 to 2 µm, more preferably 0.05 to 1.5 µm, more preferably 0.1 to 0.4 µm, and most preferably 0.1 to 1 µm. There are no specific limitations with respect to pH of the phthalocyanine green. Preferred is pH 4 to 9, and pH 4 to 8 is more preferred.

As for the iron oxide red, any of known iron oxide red pigments can be employed without any limitations. There are no specific limitations with respect to form of the iron oxide red. Iron oxide red pigments of isometric system can be employed. There are no specific limitations with respect to mean size of the iron oxide red. It is preferred that the mean size is within 0.01 to 1 µm, more preferably 0.05 to 0.5 µm, more preferably 0.08 to 0.4 µm, most preferably 0.1 to 0.3 µm. There are no specific limitations with respect to DOP absorption of the iron oxide red. It is preferred that the DOP absorption is within 10 to 50 cc/100 g, more preferably 12 to 40 cc/100 g, and most preferably 15 to 30 cc/100 g. There are no specific limitations with respect to pH of the iron oxide red. Preferred is pH 4 to 8, and pH 5 to 7 is more preferred.

As for the quinacridone red, any of known quinacridone red pigments can be employed without any limitations. There are no specific limitations with respect to form of the quinacridone red. Quinacridone red pigments of α-type, β-type and γ-types can be employed. There are no specific limitations with respect to mean size of the quinacridone red. It is preferred that the mean size is within 0.01 to 2 µm, more preferably 0.05 to 1.5 µm, and most preferably 0.1 to 1 µm.

As for the anthraquinone red, any of known anthraquinone red pigments can be employed without any limitations. There are no specific limitations with respect to form of the anthraquinone red. There are no specific limitations with respect to mean size of the anthraquinone red. It is preferred that the mean size is within 0.01 to 2 µm, more preferably 0.05 to 1.5 µm, and most preferably 0.1 to 1 µm. There are no specific limitations with respect to pH of the anthraquinone red. Preferred is pH 4 to 9.

Examples of the white pigments include titanium dioxide, white lead, and zinc oxide. Most preferred is titanium dioxide.

Any of known titanium dioxide pigments can be employed. For instance, titanium dioxide prepared by the chlorine method or sulfuric acid method can be employed. Preferred is titanium dioxide prepared by the chlorine method. There are no specific limitations with respect to the forms of the particles. Titanium dioxide of tetragonal type, rutile type or anatase type can be employed. Preferred are titanium dioxide of the tetragonal type or rutile type. There are no limitations with respect to mean size of the particles. It is preferred that the mean particle size is within 0.01 to 0.5 µm, more preferably 0.05 to 0.5 µm, more preferably 0.1 to 0.4 µm, and particularly preferably 0.2 to 0.3 µm, because these particles are satisfactory in dispersability and handling. There are no limitations with respect to DOP absorption of the titanium dioxide. It is preferred that the DOP absorption is within 5 to 40 cc/100 g, more preferably 8 to 30 cc/100 g, more preferably 10 to 20 cc/100 g, and most preferably 12 to 18 cc/100 g. Two or more white pigments can be used in combination.

Examples of the black pigments include carbon black and iron black. The black pigment can impart a high light-shielding property to the resin-molded articles. The black pigments can be employed in combination of two or more.

As for the carbon black, any of known carbon black pigments can be employed. For instance, carbon black, acetylene black, lamp black, channel black, or ketchen black produced by the furnace process or channel process can be employed. The carbon black can be subjected to oxidation processing. Preferred is a furnace black produced by the furnace process, because it has good uniform appearance and good dispersability and because it increases blackness and gloss of the resulting molded article. There are no specific limitations with respect to mean size of the carbon black. It is preferred that the mean size is within 0.001 to 0.3 µm, more preferably 0.005 to 0.2 µm, more preferably 0.01 to 0.1 µm, and most preferably 0.01 to 0.03 µm, because a carbon black of such mean size is excellent in dispersability and handling, and moreover provides high blackness and high glossiness.

The iron black can be a black iron oxide produced by the firing method. There are no specific limitations with respect to the form of the iron black. Iron black having a polyhedral form such as an octahedral form or a globular form can be used. Preferred is an octahedral iron black. There are no specific limitations with respect to mean size of the iron black. It is preferred that the mean size is within 0.05 to 0.4 µm, more preferably 0.15 to 0.35 µm, and most preferably 0.2 to 0.35 µm. There are no specific limitations with respect to DOP absorption of the iron black. It is preferred that the DOP absorption is within 10 to 80 cc/100 g, more preferably 15 to 50 cc/100 g, more preferably 20 to 40 cc/100 g, and most preferably 25 to 35 cc/100 g. There is no specific limitation with respect to pH of the iron black. Preferred is pH 9 to 11, and pH 3 to 10 is more preferred.

As the black pigment contained in the chromatic resin composition of the invention, iron black is preferred to carbon black because it has such weaker blackness that the lightness and light transmittance can be easily and delicately controlled by adjusting its content.

The particulate chromatic resin composition can further contain, if desired, various additives (e.g., dispersant such as potassium stearate, lubricant, anti-static agent, surfactant, nucleating agent, ultraviolet ray absorber, oxidation inhibitor, flame retardant).

The chromatic pigment, white pigment and optional other additives such as a black pigment can be directly added into the unused thermoplastic resin component. Otherwise, a resin component containing the pigments in high concentrations (namely, master batch) may be beforehand prepared and then mixed with another resin component containing no pigments (that is referred to as "master batch technology"). The master batch technology, in which pigments and resin components are used, is already known.

The particulate chromatic resin composition of the invention can be produced by the following process:

(1) adding presumably appropriate amounts of pigments (such as a chromatic pigment, a white pigment and, if desired, a black pigment) and optional components (such as a filler and other various additives) into an unused thermoplastic resin component, to obtain a particulate chromatic resin composition as a mixture;

(2) melting and kneading the mixture, and preparing test sheets (for measuring lightness and light transmittance) directly from the mixture or via a granular product; and (3) measuring the lightness and light transmittance of the test sheets, and examining the mixture with reference to the aforementioned condition to judge whether the amounts and kinds of the pigments are appropriate or not. If the resulting value (lightness×light transmittance (%)) is higher than 4,000 or lower than 1,300, the step (1) is again performed after the amounts and kinds of the pigments are adjusted, and if the resulting value is within the range of 1,300 to 4,000, the mixture is accepted as the chromatic resin composition of the invention.

In the above-mentioned manner, a particulate chromatic resin composition which, can be molded to produce a resin article having the desired color conditions, appearance, and characteristics is produced.

There are no specific limitations with respect to the procedures and apparatuses for mixing the pigments and additives into the unused thermoplastic resin component. Mixers and/or kneaders such as known single worm extruders (or kneaders), dual worm extruders (or kneader), tandem kneading apparatuses comprising a dual worm extruder and a single worm extruder (or kneader) combined in series, calenders, banbury mixers, kneading rolls, brabender, plastgraphs or kneaders can be employed.

The particulate chromatic resin composition of the invention can be processed by known molding procedures such as extrusion molding, sheet formation molding, injection molding, injection-compression molding, gas injection molding, blow molding, or vacuum molding, to give various chromatic resin-molded articles.

The chromatic resin composition of the invention can give various chromatic molded articles having desired surfaces, such as an article having a glossy surface, an embossed article, and an article having a smoothly embossed pattern.

In the following description, the particulate white resin composition of the invention is then explained in detail.

The white resin composition of the invention comprises an unused thermoplastic resin component such as an unused polyolefin or ABS resin, a white pigment, a black pigment and, optionally, a filler. The thermoplastic resin component can contain an elastomer resin.

Examples of the thermoplastic resins are the same as those described above for the particulate chromatic resin composition.

Examples of the elastomer resins are also the same as those described above for the chromatic resin composition.

In preparing the particulate white resin composition of the invention, a relatively small amount of reclaimed resin material can be mixed into the unused thermoplastic resin component (virgin material), if desired.

Examples of the fillers usable in the white resin composition are the same as those described above for the chromatic composition.

Examples of the white pigments are the same as those described above for the chromatic composition.

Examples of the black pigments are the same as those described above for the chromatic composition.

As the black pigment contained in the white resin composition of the invention, iron black is also preferred to carbon black because it has such weaker blackness that the lightness and light transmittance can be easily and delicately controlled by adjusting its content.

The white resin composition of the invention can further contain a small amount of chromatic pigments, if desired. Examples of the chromatic pigments are the same as those described above for the chromatic composition. There are no specific limitations with respect to hue of the chromatic pigment. Any of yellow pigments, blue pigments, red pigments, and green pigments can be employed. The pigments can be employed in combination of two or more.

The white composition of the invention can furthermore contain, if desired, various additives (e.g., dispersant such as potassium stearate, lubricant, anti-static agent, surfactant, nucleating agent, ultraviolet ray absorber, oxidation inhibitor, flame retardant).

The white pigment, black pigment and optional other additives can be directly added into the unused thermoplastic resin component. Otherwise, a resin component containing the pigments in high concentrations (namely, master batch) may be beforehand prepared and then mixed with another resin component containing no pigments (that is referred to as "master batch technology"). The master batch technology, in which pigments and resin components are used, is already known.

The particulate white resin composition of the invention can be produced by the following process:

(1) adding presumably appropriate amounts of pigments (such as a white pigment and a black pigment) and optional components (such as a filler, a chromatic pigment and other various additives) into an unused thermoplastic resin component, to obtain a particulate white resin composition as a mixture;

(2) melting and kneading the mixture, and preparing test sheets (for measuring lightness and light transmittance) directly from the mixture or via a particulate product; and (3) measuring the lightness and light transmittance of the test sheets, and examining the mixture with reference to the aforementioned condition to judge whether the amounts and kinds of the pigments are appropriate or not. If the resulting value (lightness×light transmittance (%)) is higher than 4,000 or lower than 1,300, the step (1) is again performed after the amounts and kinds of the pigments are adjusted, and if the resulting value is within the range of 1,300 to 4,000, the mixture is accepted as the white resin composition of the invention.

In the above-mentioned manner, a particulate white resin composition which can be molded to produce a resin article having the desired color conditions, appearance, and characteristics is produced.

The procedures and apparatuses for preparing the particulate white resin composition of the invention and for producing various white resin-molded articles therefrom are the same as those described above for the chromatic resin composition.

The white resin composition of the invention can give various molded, articles having desired surfaces, such as an article having a glossy surface, an embossed article, and an article having a smoothly embossed pattern. The term "white" of the white resin composition in the invention generally means not only achromatic white but also whitish chromatic colors such as ivory and light-gray.

EXAMPLES

The invention is further described below by the following non-limiting examples.

(1) Measurement of Whiteness and Hue

Resin pellets were placed in an injection molding machine (clamping pressure: 130 tons, metal mold: square plate (100 mm×100 mm×3 mm, one surface: embossed, another surface: mirror) under the following conditions, to give a specimen (thickness: 3 mm):

molding temperature: C1-C2-C3-C4=180° C.-190° C.-200° C.-210° C.

molding pressure: P1-P2-P3-P4=108-98-88-78 (MPa)

molding rate: V1-V2-V3-V4=30-30-20-20(%)

screw back pressure: free screw rotation: 60% mold temperature: 40° C.

cycle: injection: 10 sec, and cooling: 20 sec.

The embossed surface of the specimen is subjected to measurements of L*, a*, b*, L, a and b, by means of a colorimeter (SM-4, available from Suga Test Instruments Co., Ltd.), to obtain a whiteness, a lightness and a hue in a known manner.

(2) Measurement of Light Transmittance

The resin pellets were placed between a pair of ferrotype plates (spacer: 70×50×0.05 mm), and thereby a film (50±3 µm, a specimen for measurement of total light transmittance) was prepared using a hot press (clamping pressure: 40 tons) under the following conditions: heating temperature; 230° C., heating period; 2 minutes, deforming step: one minute, pressing period (pressure: 100 kg/cm$^2$): one minute, cooling temperature: 20° C., and cooling period: 2 minutes.

The specimen was subjected to measurement of the total light transmittance (%, namely, light-transmittance (%)) using a turbidimeter (NDH 2000, available from Japan Denshoku Co., Ltd.). The light source was a halogen lamp (rated values: 5V9W, aperture for light entrance: 20 mmφ). The measurements were made five times at different points on the specimen and processed to give an average value.

(3) Preparation of Specimen, and Evaluation on Appearance of its Surface

To 100 weight parts of the resin pellets, 0.05 weight part of iron powder (mean particle size: 0.3 mm) was added. The mixture was dry-blended in a tumbler (available from Platech Co., Ltd.) for 5 minutes. From the mixture, a specimen (100 mm×100 mm×3 mm, one surface: embossed, another surface: mirror) was molded under the above conditions of injection. The appearance of the obtained specimen was observed to judge how apparent the solid foreign materials (iron powder) were on the surfaces, and thereby was classified into the following three grades:

1: the solid foreign materials were apparent on both of the embossed and mirror surfaces (unacceptable);

2: the solid foreign materials were not apparent on the embossed surface, but apparent on the mirror surface (acceptable); and 3: the solid foreign materials were invisible on both of the embossed and mirror surfaces (preferable).

(A) Preparation of Particulate Chromatic Resin Composition

—Components—

(1) Polyolefin resin: crystalline polypropylene (virgin resin, MFR=30 g/10 minutes, ethylene/propylene block copolymer containing 7 wt. % of ethylene);

(2) White pigment: titanium dioxide (the amount of which is set forth in Table 1 in terms of weight % based on the weight of the polyolefin resin);

(3) Chromatic pigments: iron oxide red, ultramarine blue, isoindoline A (available from Ciba Specialty Chemicals, CROMOPHTAL ORANGE 2G), and isoindoline B (available from Ciba Specialty Chemicals, IRGAZIN YELLOW 3RLT-N) (the amounts of which are set forth in Table 1 in terms of weight % based on the weight of the polyolefin resin);

(4) Black pigment: iron black (the amount of which is set forth in Table 1 in terms of weight % based on the weight of the polyolefin resin);

(5) Dispersant: potassium stearate (the amount of which is set forth in Table 1 in terms of weight % based on the weight of the polyolefin resin);

(6) Oxidation inhibitor: IRGAFOS 168 (the amount of which is set forth in Table 1 in terms of weight % based on the weight of the polyolefin resin).

Examples A1 to A3

Comparison Examples A1 to A3

Preparation of Resin Pellets

To 100 weight parts of the polyolefin resin, the white pigment, the black pigment, the chromatic pigments, the dispersant and the oxidation inhibitor were added in the amounts set forth in Table 1. The mixture was dry-blended in a tumbler (available from Platech Co., Ltd.), and melted and kneaded in a dual worm extruder (UME40-48T, available from Ube Industries, Ltd.) under the conditions of a barrel temperature of 220° C. and a processing rate of 60 kg/hr., to give resin pellets.

TABLE 1

|  | Com. A1 | Com. A2 | Ex. A1 | Ex. A2 | Com. A3 | Ex. A3 |
|---|---|---|---|---|---|---|
| (Color) | colorless | orange | orange | orange | blue | blue |
| (Amounts of components) | | | | | | |
| Iron oxide red | — | — | — | — | 0.008 | 0.008 |
| Ultramarine blue | — | — | — | — | 0.250 | 0.550 |
| Iron black | — | — | — | 0.030 | 0.020 | 0.100 |
| Titanium dioxide | — | 0.400 | 1.920 | 12.000 | 0.100 | 1.070 |
| Isoindoline A | — | 0.040 | 0.070 | 0.660 | — | — |
| Isoindoline B | — | 0.150 | 0.480 | 3.400 | — | — |
| Dispersant | 0.100 | 0.100 | 0.100 | 0.100 | 0.100 | 0.100 |
| Oxidation inhibitor | 0.050 | 0.050 | 0.050 | 0.050 | 0.050 | 0.050 |
| (Tone) | | | | | | |
| $L^*$ | 76.28 | 73.34 | 74.79 | 74.65 | 57.36 | 57.85 |
| $a^*$ | −0.86 | 21.62 | 22.07 | 20.70 | −4.05 | −4.04 |
| $b^*$ | −2.65 | 49.91 | 49.93 | 47.18 | −15.45 | −15.68 |
| (Whiteness) | | | | | | |
| W | 70.83 | 49.37 | 49.84 | 51.17 | 48.09 | 48.50 |
| (Transmittance) (%) | 97.88 | 72.69 | 50.81 | 43.76 | 70.23 | 44.51 |
| ($L^*$ × transmittance) | 7455 | 5331 | 3800 | 3267 | 4028 | 2575 |
| (Appearance) | 1 | 1 | 2 | 3 | 1 | 3 |

The results in Table 1 indicate that molded articles produced from the particulate chromatic resin composition of the invention are excellent in hiding foreign materials caught therein, and hence that the chromatic resin composition of the invention is suitable for producing resin articles for various uses.

(B) Preparation of Particulate White Resin Composition

—Components—

(1) Polyolefin resin: crystalline polypropylene (virgin resin, MFR=30 g/10 minutes, ethylene/propylene block copolymer containing 7 wt. % of ethylene);

(2) Filler: 15 weight parts of talc (hydrated magnesium silicate, mean grain size: 2.7 μm);

(3) White pigment: titanium dioxide (the amount of which is set forth in Tables 2 and 3 in terms of weight % based on the total weight of the above components (1) and (2));

(4) Black pigment: iron black (the amount of which is set forth in Tables 2 and 3 in terms of weight % based on the total weight of the above components (1) and (2));

(5) Chromatic pigments: titanium yellow and iron oxide red (the amounts of which are set forth in Tables 2 and 3 in terms of weight % based on the total weight of the above components (1) and (2));

Example B1

Comparison Example B1

Preparation of White Resin Pellets

To 100 weight parts of the polyolefin resin, the white pigment, the black pigment and the chromatic pigments were added in the amounts set forth in Table 2. The mixture was dry-blended in a tumbler (available from Platech Co., Ltd.), and melted and kneaded in a dual worm extruder under the conditions of a barrel temperature of 220° C. and a processing rate of 60 kg/hr., to give white resin pellets.

Examples B2 to B5

Comparison Examples B2 to B3

Preparation of White Resin Pellets

To 90 weight parts of the polyolefin resin and 10 weight parts of the filler, the white pigment, the black pigment and the chromatic pigments were added in the amounts set forth in Table 3. The mixture was dry-blended in a tumbler (available from Platech Co., Ltd.), and melted and kneaded in a dual worm extruder under the conditions of a barrel temperature of 220° C. and a processing rate of 60 kg/hr., to give white resin pellets.

TABLE 2

|  | Comparison Example B1 | Example B1 |
|---|---|---|
| (Amounts of pigments) | | |
| Titanium yellow | 0.008 | 0.02 |
| Iron black | 0.005 | 0.01 |
| Titanium dioxide | 2 | 7 |
| Iron oxide red | 0.002 | 0.003 |
| (Tone) | | |
| $L^*$ | 90.22 | 90.51 |
| $a^*$ | −1.81 | −1.96 |
| $b^*$ | 1.74 | 1.7 |
| L | 87.47 | 87.99 |
| a | −1.87 | −1.95 |
| b | 1.71 | 1.67 |
| (Whiteness) | | |
| W | 87.22 | 87.72 |
| (Transmittance) | 71.68% | 42.6% |
| ($L^*$ × transmittance) | 6467 | 3356 |
| (Appearance) | 1 | 2 |

TABLE 3

|  | Comparison Ex. | | Examples | | | |
| --- | --- | --- | --- | --- | --- | --- |
|  | B2 | B3 | B2 | B3 | B4 | B5 |
| (Amounts of pigments) | | | | | | |
| Titanium yellow | 0.05 | — | 0.11 | 0.15 | 0.20 | — |
| Iron black | 0.015 | 0.015 | 0.03 | 0.05 | 0.10 | 0.05 |
| Titanium dioxide | 1.50 | 1.50 | 3.50 | 5.50 | 9.50 | 5.50 |
| Iron oxide red | — | — | — | — | 0.005 | — |
| (Tone) | | | | | | |
| L* | 84.51 | 86.53 | 84.22 | 85.17 | 87.43 | 85.62 |
| a* | −1.04 | −1.73 | −1.56 | −1.04 | −1.53 | −0.88 |
| b* | 3.15 | −1.13 | 1.29 | 1.33 | 4.16 | −1.18 |
| L | 80.65 | 83.10 | 80.30 | 81.45 | 84.20 | 82.00 |
| a | −1.00 | −1.69 | −1.50 | −1.00 | −1.50 | −0.85 |
| b | 3.00 | −1.15 | 1.22 | 1.27 | 4.00 | −1.20 |
| (Whiteness) | | | | | | |
| W | 80.39 | 82.97 | 80.21 | 81.38 | 83.63 | 81.94 |
| (Transmittance) (%) | 66.0 | 67.9 | 49.2 | 38.2 | 30.0 | 39.8 |
| (L* × transmittance) | 5306 | 5634 | 3946 | 3109 | 2509 | 3261 |
| (Appearance) | 1 | 1 | 2 | 2-3 | 3 | 2-3 |

The results in Tables 2 and 3 indicate that molded articles produced from the particulate white resin composition of the invention are excellent in hiding foreign materials caught therein, and hence that the white resin composition of the invention is suitable for producing white resin articles for various uses.

(C) Preparation of Particulate White Resin Composition (for Producing Resin-Molded Articles Used as Automobile Parts)

—Components—

(1) Polyolefin resin: 65 weight parts of crystalline polypropylene (virgin resin, MFR=70 g/10 minutes, ethylene/propylene block copolymer containing 7 wt. % of ethylene);

(2) Elastomer resin: 20 weight parts of ethylenepropylene copolymer resin (virgin resin, Mooney viscosity: MI1+4 (100° C.)=35, ethylene content: 72 wt. %)

(3) Filler: 15 weight parts of talc (hydrated magnesium silicate, mean grain size: 2.7 μm);

(4) White pigment: titanium dioxide (the amount of which is set forth in Table 4 in terms of weight % based on the total weight of the above-mentioned components (1), (2) and (3));

(5) Black pigment: iron black (the amount of which is set forth in Table 4 in terms of weight % based on the total weight of the above-mentioned components (1), (2) and (3));

(6) Chromatic pigments: titanium yellow and iron oxide red (the amounts of which are set forth in Table 4 in terms of weight % based on the total weight of the above-mentioned components (1), (2) and (3));

(7) Other additives: dispersant (potassium stearate, the amount of which was 0.1 wt. % based on the total weight of the above components (1), (2) and (3)); IRGAFOS 168:0 (the amount of which was 0.1 wt. % based on the total weight of the above-mentioned components (1), (2) and (3)); and IRGANOX 1010 (the amount of which was 0.1 wt. % based on the total weight of the above-mentioned components (1), (2) and (3)).

Examples C1 to C4

Comparison Examples C1 to C2

Preparation of White Resin Pellets

The components were dry-blended in a tumbler (available from Platech Co., Ltd.), and melted and kneaded in a dual worm extruder under the conditions of a barrel temperature of 220° C. and a processing rate of 60 kg/hr., to give white resin pellets.

TABLE 4

|  | Comparison Ex. | | Examples | | | |
| --- | --- | --- | --- | --- | --- | --- |
|  | C1 | C2 | C1 | C2 | C3 | C4 |
| (Amounts of pigments) | | | | | | |
| Titanium yellow | 0.03 | — | 0.108 | 0.16 | 0.23 | — |
| Iron black | 0.01 | 0.01 | 0.034 | 0.05 | 0.08 | 0.05 |
| Titanium dioxide | 1.2 | 1.2 | 4.20 | 6.20 | 9.20 | 6.2 |
| Iron oxide red | — | — | — | — | 0.002 | — |
| (Tone) | | | | | | |
| L* | 86.5 | 87.21 | 86.82 | 86.79 | 86.61 | 87.67 |
| a* | −1.13 | −0.84 | −1.19 | −1.18 | −0.91 | −0.89 |
| b* | 4.31 | −0.74 | 4.5 | 4.54 | 4.47 | −1.29 |
| L | 84.1 | 84.65 | 84.34 | 84.45 | 84.29 | 85.44 |
| a | −1.79 | −1.15 | −1.87 | −1.91 | −1.54 | −1.36 |
| b | 4.01 | −1.24 | 4.22 | 4.27 | 4.23 | −1.76 |

TABLE 4-continued

| | Comparison Ex. | | Examples | | | |
|---|---|---|---|---|---|---|
| | C1 | C2 | C1 | C2 | C3 | C4 |
| | (Whiteness) | | | | | |
| W | 83.5 | 84.55 | 83.69 | 83.76 | 83.65 | 85.27 |
| (Transmittance) (%) | 63.7 | 65.9 | 44.9 | 36.2 | 27.3 | 37.1 |
| (L* × transmittance) | 5310 | 5747 | 3894 | 3143 | 2368 | 3253 |
| (Appearance) | 1 | 1 | 2 | 2-3 | 3 | 2-3 |

The results in Table 4 indicate that molded articles produced from the particulate white resin composition of the invention are in hiding foreign materials caught therein, and hence that the white resin composition of the invention is suitable for producing white resin articles used as automobile parts.

What is claimed is:

1. A particulate chromatic resin composition comprising an unused thermoplastic resin component, a chromatic pigment and a white titanium dioxide pigment in an amount of 1 to 12 wt. %, a sheet of 50 µm thick made from which shows a total light transmittance in the range of 15 to 60% and shows a relationship between a lightness and a light transmittance satisfying the following condition:

$$1300 \leq (L^* \times B) \leq 4000$$

wherein L* means a lightness of a sheet of 3 mm thick having been made of the resin composition, and B means the above-mentioned total light transmittance.

2. The resin composition of claim 1 which further comprises a black pigment in an amount of 0.01 to 1.0 wt. %.

3. The resin composition of claim 1 which further comprises a filler.

4. The resin composition of claim 1, in which the thermoplastic resin component is mainly composed of polyolefin.

5. The resin composition of claim 1, the sheet made from which shows a whiteness of less than 55.

6. The resin composition of claim 2, in which the black pigment is iron black.

7. A resin-molded article produced by heating to melt the particulate chromatic resin composition of claim 1 and then molding the melt.

8. A particulate white resin composition comprising an unused thermoplastic resin component, a white titanium dioxide pigment in an amount of 1 to 12 wt. % and a black pigment in an amount of 0.01 to 1.0 wt %, a sheet of 50 µm thick made from which shows a total light transmittance in the range of 15 to 60% and shows a relationship between a lightness and a light transmittance satisfying the following condition.

$$1300 \leq (L^* \times B) \leq 4000$$

wherein L* means a lightness of a sheet of 3 mm thick having been made of the resin composition, and B means the above-mentioned total light transmittance.

9. The resin composition of claim 8 which further comprises a filler.

10. The resin composition of claim 8, in which the thermoplastic resin component is mainly composed of polyolefin.

11. The resin composition of claim 8, the sheet made from which shows a whiteness of 55 or more.

12. The resin composition of claim 8, in which L* meaning a lightness of the sheet is in the range of 55 to 90.

13. The resin composition of claim 8, in which the black pigment is iron black.

14. A resin-molded article produced by heating to melt the particulate white resin composition of claim 8 and then molding the melt.

15. A resin-molded article used for automobile parts, produced by heating to melt the particulate white resin composition of claim 8 and then molding the melt.

* * * * *